United States Patent
Szaniszlo

[11] Patent Number: 5,803,574
[45] Date of Patent: Sep. 8, 1998

[54] SAFETY LIGHT

[76] Inventor: John Szaniszlo, 1224 - 45 Street, Edmonton, Alberta, Canada, T6L 3N8

[21] Appl. No.: 436,815

[22] Filed: May 8, 1995

[51] Int. Cl.[6] .......................................................... B62J 6/00
[52] U.S. Cl. ............................. 362/32; 362/72; 362/276; 362/802; 340/432
[58] Field of Search ................ 362/72, 32, 276, 362/802, 78, 249, 235, 236, 190, 191, 196, 184; 340/432

[56] References Cited

U.S. PATENT DOCUMENTS

| | | | |
|---|---|---|---|
| 4,290,047 | 9/1981 | Latta, Jr. ................................. | 340/134 |
| 4,787,014 | 11/1988 | Wodder ................................... | 362/72 X |
| 4,814,951 | 3/1989 | Larsen ................................ | 340/432 X |
| 4,949,228 | 8/1990 | Lin et al. ................................. | 362/72 |
| 5,278,732 | 1/1994 | Frankum ................................. | 362/72 |
| 5,333,101 | 7/1994 | McEvoy ................................. | 362/72 |
| 5,418,697 | 5/1995 | Chiou ................................. | 362/802 X |
| 5,475,572 | 12/1995 | Tseng ................................. | 362/78 |
| 5,477,425 | 12/1995 | Sun et al. ................................. | 362/72 |

*Primary Examiner*—Thomas M. Sember
*Attorney, Agent, or Firm*—Davis and Bujold

[57] ABSTRACT

A safety light comprises a multi-faceted transmissive reflector housing, a flashing light and a control unit powered by a battery. The control unit turns on the flashing light when motion and reduced ambient light conditions such as dusk to darkness are detected. The safety light may be affixed on a spoke of a bicycle wheel, close to the perimeter, and provides a highly visible streak of light from all viewing angles when the wheel is in motion.

8 Claims, 7 Drawing Sheets

SAFETY LIGHT

FIELD OF THE INVENTION

This invention is directed to a safety light and more particularly to a safety light which is automatically activated when motion and dusk or dark conditions are prevailing. The safety light of this invention may be attached to a person or object for making the person or object highly visible to others. The application disclosed herein is a safety light for bicycles.

BACKGROUND OF INVENTION

Bicycling is a major sport and fast becoming an essential means of transportation around the world, and therefore bicycle safety is increasingly a major concern. A large number of accidents between bicycles and motor vehicles, and bicycles and pedestrians occur daily which can result in serious injury and/or death. Many of these accidents could be prevented if the bicyclist in question was made more visible especially during dusk or darkness conditions.

DESCRIPTION OF THE RELATED ART

Although riding a bicycle without a proper lighting apparatus is not advised and it is penalized by law in many jurisdictions, designing devices for providing an additional means of safety when riding in dusk to dark conditions is a constant trend.

As an example, U.S. Pat. No. 3,987,409 (Freeman) discloses a plurality of individually powered lights, fastened to the spokes of the front and rear wheels of a bicycle. Each wheel is covered on both sides with an apperctured cover so that rotation of the wheel results in a visible flashing light to the sides of each wheel. This device requires a plurality of batteries, which should be replaced at different times. In addition, the use of a plurality of lights and batteries, placed towards the periphery of the wheel, has the disadvantage of increasing the weight of the wheels as well as increasing the momentum of inertia of the wheel.

U.S. Pat. No. 4,135,229 (Modurkay) discloses a bicycle safety device comprising a light bulb powered with a battery. The device is provided with a housing with light transmissive side walls, which may be attached between two spokes of a bicycle wheel with the side walls facing laterally away from the wheel. A switch is used for manually switching the light. This device, is not provided with means for automatically switching the light according to the ambient light and speed conditions.

SUMMARY OF THE INVENTION

It is an object of the present invention to provide a safety light which automatically turns on a flashing light when both motion and low light conditions are sensed, thus requiring no operator intervention. It is desirable to have the safety light automatically turned on/off when the illumination condition change, especially when this occur unexpectedly, as for example due to travel through dark tunnels, impending rain storms, eclipses, or any other such circumstance. The ability for the device of the invention to automatically activate the internal flashing light under preset conditions is a significant safety feature of this invention.

Another object of the invention is to provide a safety light for bicycles wherein light is produced by an active, self contained battery powered light source and this light is guided through a reflector housing and light pipes arranged around the reflector housing for high visibility.

It is still another object of the present invention to provide a device effective for enhancing, for example, the bicycle riders visibility to motorists and pedestrians. The device of the invention is designed such that the rotational movement of a bicycle wheel, coupled with the flashing light projected through light pipes built into the multi-faceted transmissive lens of the device housing create a highly visible streak of light that is constantly in motion in a rotating plane visible from all angles, including the sides, front and back of the bicycle.

Another object of the present invention is to provide a bicycle safety light which is easy to install in one piece on a bicycle wheel by affixing the device onto a single spoke with one fastener assembly. More than one device can be installed on each wheel.

It is still another object of the present invention to provide a safety accessory for bicycles having a multi-faceted transmissive reflector housing which acts also as normal bicycle reflector for reflecting external light directed towards it from, for example, an automobile headlight or other source.

Accordingly, the present invention provides for a portable safety light comprising: an electronic unit for detecting the ambient illumination and automatically emitting an output signal of a frequency in the visible range when the ambient illumination is under a threshold; a housing of multifaced transmissive lens for enclosing said electronic unit and for receiving and transmitting said output signal from said electronic unit to the outer surface of said housing to produce a highly visible light; and means for fixing said housing on a person or object.

An advantage of the safety light of this invention is that it automatically determines the ambient conditions as motion and intensity of light and, in accordance with safety thresholds stored in the control unit, turns on a highly visible light, without the user's intervention.

DESCRIPTION OF THE DRAWINGS

A preferred embodiment of the invention will be described in the following with reference to the accompanying drawings in which.

DESCRIPTION OF PREFERRED EMBODIMENT

Figure 1:
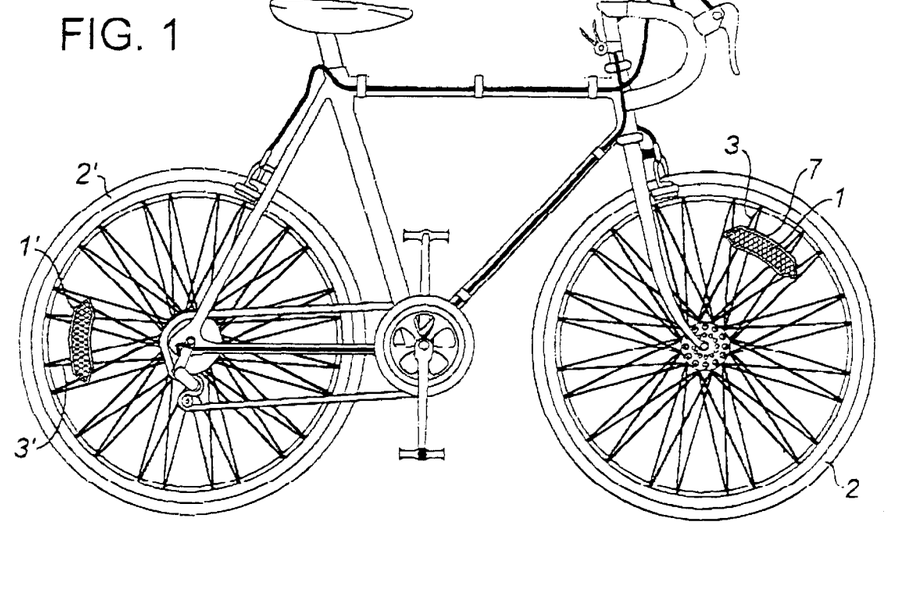
FIG. 1 is a view of a bicycle with the safety light of the present invention shown attached to both front and back wheels.

FIG. 1 illustrates a bicycle with the safety light of the present invention shown attached to both front and back wheels. The safety lights 1 and 1' are mounted each on a respective bicycle wheel 2, 2' onto spokes 3, 3'. The safety light comprises an electronic unit 5 provided with a light source, and a housing 7 for protecting the electronic unit. The housing forms a light circuit which amplifies the light emitted by the light source, and also reflects any light incident on the housing. The safety light may be mounted to a suitable location with means for fixing so that it is displaced together with the person or object to be protected. In the preferred embodiment of this invention, the safety light is attached to a bicycle spoke, but it may also be attached to a runner's feet for example.

It is to be understood that in the present description, the terms "right" and "left" are used with reference to the direction of travel of the bicycle, the safety light being attached to the left side of the bicyclist, as illustrated in FIG. 1. The safety light may, of course be attached to the right side of the bicycle if desired, in which case the definitions "left" and "right" pertaining to some features disclosed herein should be interchanged.

Figure 2:
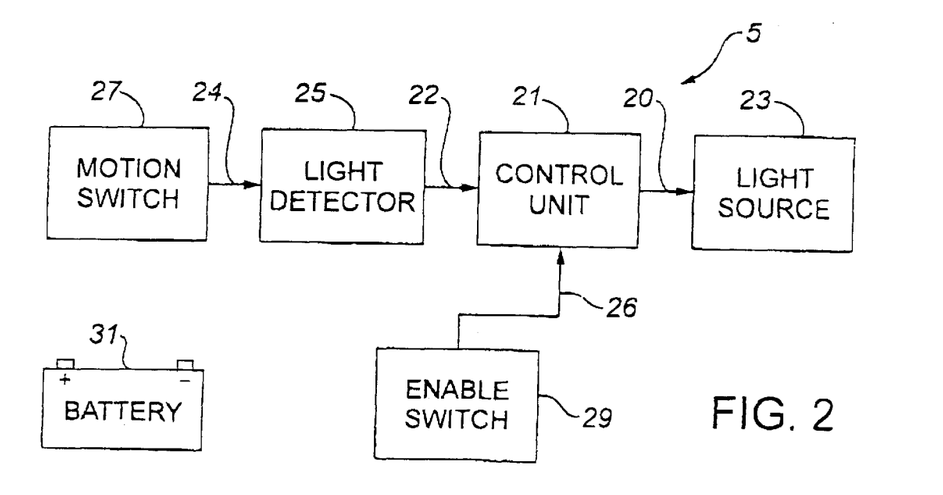
FIG. 2 is a block diagram of the safety light of the present invention.

FIG. 2 illustrates a block diagram of the electronic unit of the bicycle safety light of the present invention. As illustrated on FIG. 2, a light source unit 23 is controlled by a control unit 21 with an actuating signal 20. Light source 23 emits a flashing light. The control unit 21 generates the actuating signal 20 only when a first control signal 22 and a second control signal 24 are present at its input. First control signal 22 is generated by a light detector unit 25 when the ambient light conditions are poor. The second signal 24 is generated by a motion detector 27 which determines when the safety light Is displaced. In addition, the actuating signal 20 may be generated only when an enable switch 29 is open to disconnect a third control signal 26 which disables the control unit 21 when the safety light has not yet been installed for the first time.

In the preferred embodiment illustrated in the drawings, the light source and electronic circuit are powered by self contained battery 31.

Figure 3:
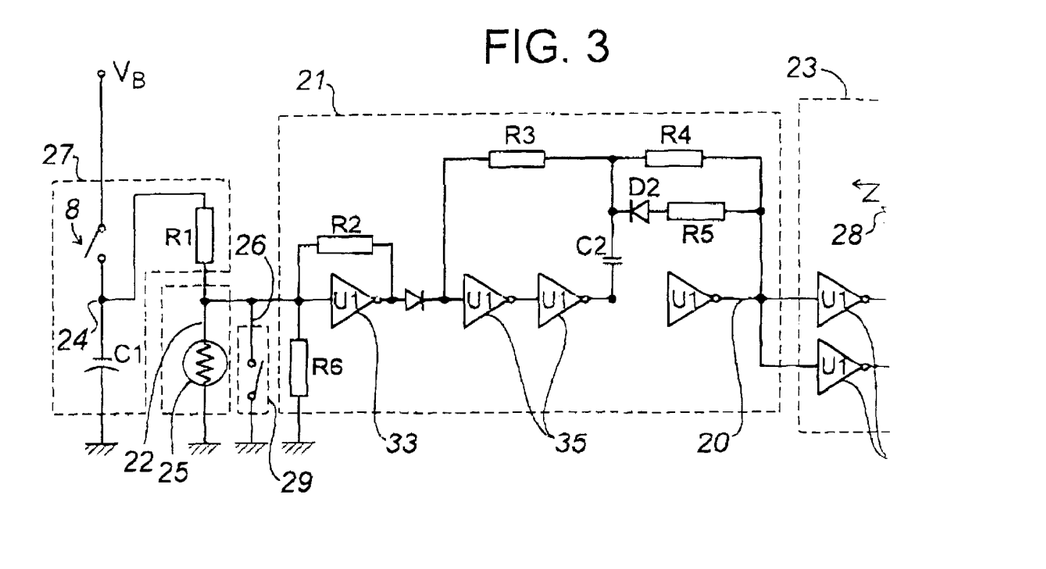
FIG. 3 is an exemplary electrical schematic of the safety light.

The electrical schematic of the electronic unit illustrated in FIG. 3. Input of control unit 21 receives control signals 22, 24 and 26 from the light detector 25, motion detector 27 and enable switch 29, respectively.

Light sensor 25 may be of any suitable type which has a resistance variable with the ambient illumination. In normal illumination conditions the resistance of sensor 25 is hight and signal 22 is logic "0". In poor illumination conditions, the resistance of the sensor 25 decreases, and the first control signal 22 at the input of control unit 21 may become logic "1" if switch 8 is closed.

Switch 8 of the motion detector 27 provides the second control signal 24. The operation of switch 8 will be described in more details in connection with the description of FIGS. 6–14. Once switch 8 is closed, the second control signal 24 becomes logic "1".

Enable switch 29 is a break contact which is interrupted when the safety light is installed on the bicycle spoke for the first time. When the break contact 29 is broken, the third control signal 26 which was kept to a logic state "0" is interrupted and the input of control unit 21 may now assume the value dictated by the first and the second signals.

The output of the control unit 21 provides oscillating signal 20 to light source 23. The frequency of this signal is set in the visible range between 9 and 30 Hz by selecting the components R3 and C2 of pulse rate frequency circuit comprised of invertrs 35, and components R3 and C2. In addition, the duty cycle of signal 20 may be adjusted between 10% and 90% by appropriate selection of the components C2, R4 and R5. Duty cycle can be set to preserve life of the battery 31 or alternatively to enhance the power of the light output.

The circuit made of inverter 33, resistors R2, R6 and diode D1 at the output of invertor 33 provides a delayed signal to pulse rate frequency circuit when switch 8 is closed only periodically, a condition which is present at low rotational velocity of bicycle wheel.

The light detector comprises a photodiode 28 connected to the positive pole of battery 31 and to inverters 37 arranged in parallel. Preferably, an integrated circuit with five inverters is used for the control unit, and any suitable integrated circuit may be used for inverters 33, 35, and 37.

Figure 4:
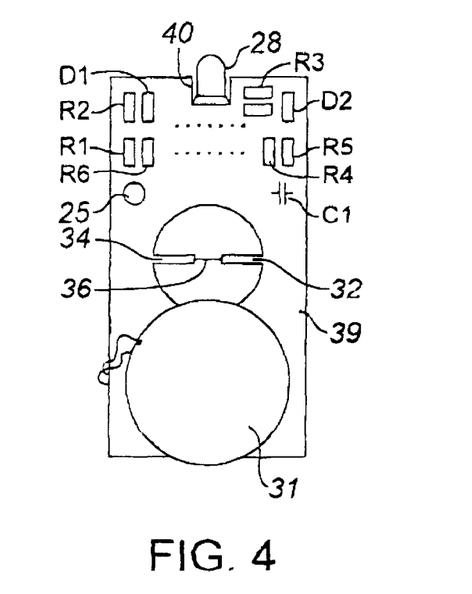
FIG. 4 shows the components side of the printed circuit board assembled according to FIG. 3.
Figure 5:
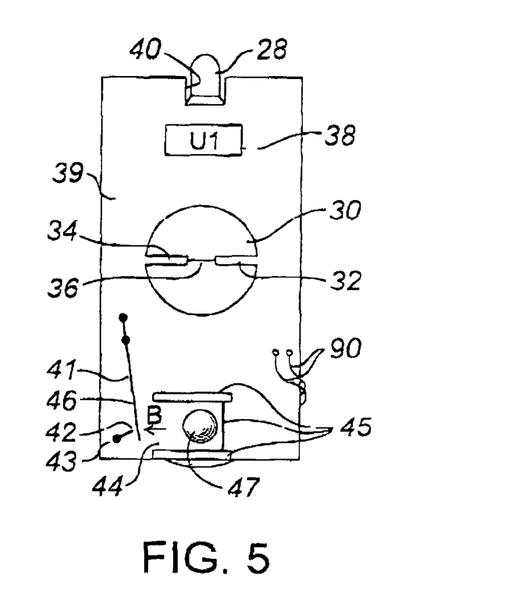
FIG. 5 shows the switch side of the printed circuit board assembled according to FIG. 3.

The components of the control unit are implanted on a printed circuit board (PCB) 39 as illustrated on FIGS. 4 to 7. FIG. 4 shows the components side of the assembled PCB 39, while FIG. 5 shows the switch side of the assembled PCB.

In the centre of PCB 39, a central hole 30 is cut. Hole 30 allows passage of the means for assembling and fixing the housing 7 to the spoke, and also forms the enable switch 29. Switch 29 is comprised of two finger-shaped patches 32, 34 of which patch 34 is in electrical contact with battery 31. A wire 36 is soldered between patches 32 and 34. Wire 36 is broken when the means for fixing are inserted through the passage in the housing of the safety light and the central hole 30 of the PCB 39.

The components are preferably arranged as could be seen in FIG. 4 on one side of central hole 30. The photodiode 28 is mounted in a cut-out 40 for allowing an unobstructed radiation of light in all directions. The integrated circuit 38 with inverters 33, 35, and 37 is mounted on the switch side of the PCB 39 and its pins are soldered on the component side. On the component side, FIG. 4 illustrates also battery 31, which is arranged to cover the area of the PCB across from the components with respect to hole 30. Battery 31 is positioned on PCB 39 so that the negative pole is in direct contact with a conductive area covering the PCB in this zone on both sides. The poles of battery 31 are also connected with wires 90 to the respective positive and negative poles on the PCB. The battery in not fixed on the PCB, its displacement is restricted when the housing 7 is assembled.

On the switch side of the PCB, as illustrated in FIG. 5, besides integrated circuit 38 is the motion switch 8, provided in the area generally corresponding to the area occupied on the component side by the battery 31. The switch 8 has a mobile contact, cantilever 41 and a fixed contact, stop 43, both made of electrically conductive materials and it is better shown on FIGS. 6 and 7. The stop 43 is in electrical contact with one of the poles of battery 31, the positive pole in the embodiment illustrated in the drawings. Cantilever 41 is implanted on PCB 39 in a position where it makes electrical contact with the positive pole of capacitor C1. Cantilever 41 and stop 43 are arranged to provide a gap 42 therebetween.

Switch 8 is mounted on PCB 39 as illustrated on FIG. 5, and leaves a substantially rectangular area 44. Area 44 is surrounded along three sides by the ball guides 45 fixed on the PCB 39 and at the fourth side by the tip 46 of cantilever 41 to form a passage. A ball 47 is constrained to move in this enclosed passage, so as to close or open the switch if the safety light moves or not. When the bicycle wheel rotates, the ball is displaced by the centrifugal force to urge the cantilever 41 towards the stop 43. Since the cantilever 41 is made of a flexible conductive material, tip 46 may be displaced towards contact 47 to close gap 42, when the ball 47 is displaced in the direction indicated by arrow B. When gap 42 is closed, signal 24 is applied to the input of control unit 21.

Figure 6:
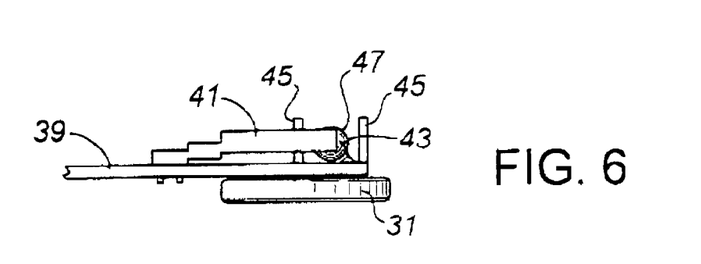
FIG. 6 is a partial lateral view of the printed circuit board depicting the operation of the motion switch.
Figure 7:
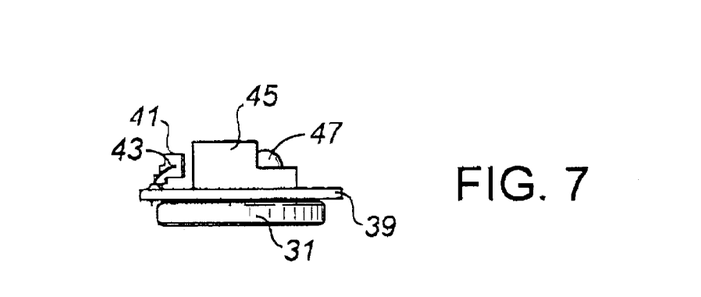
FIG. 7 is a short-side view of the printed circuit board depicting the operation of the motion switch.

The construction of switch 8 is shown in further detail in FIGS. 6 and 7. To conclude, the passage wherein movement of ball 47 is constrained is formed by guides 45 along three sides, tip 46 of cantilever 41 along the fourth side and the fifth and sixth sides are formed by the area 48 of the PCT 39 and a corresponding inner surface of the housing in a manner which will be explained next in further detail.

Figure 11:
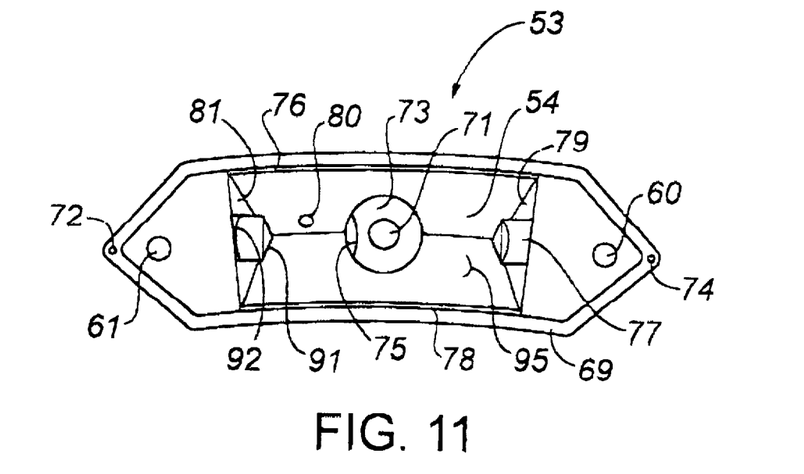
FIG. 11 is frontal view of the left half of the lens housing, showing the internal features of the half.
Figure 12A:
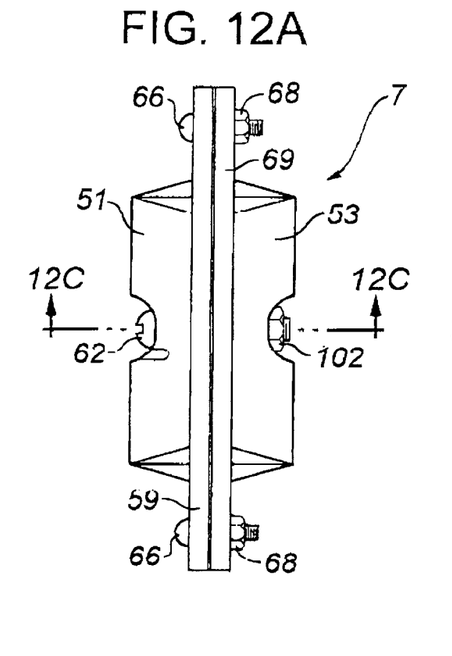
FIG. 12A is a perspective lateral view of the housing of the device showing the two halves assembled.
Figure 12B:
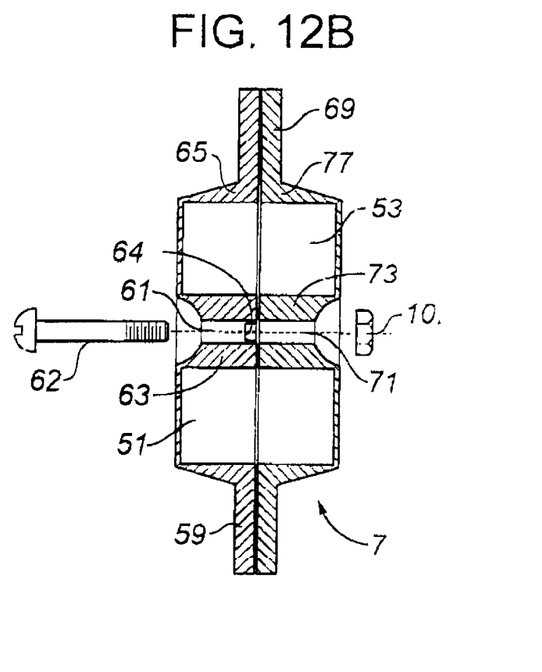
FIG. 12B is a longitudinal cross-section of the housing of the device.
Figure 12C:
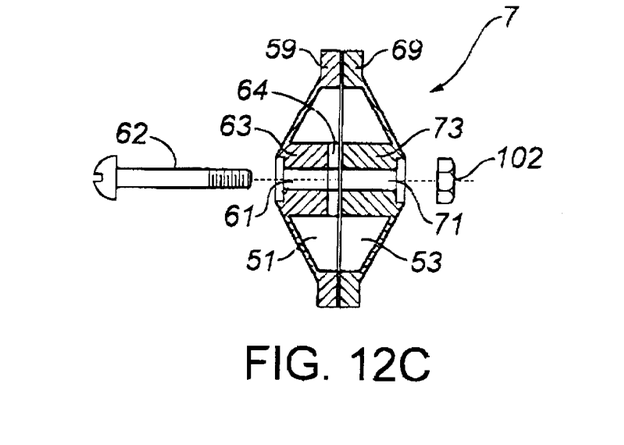
FIG. 12C is a transversal cross-section of the housing of the device, along lines A—A in FIG. 10A.
Figure 13:
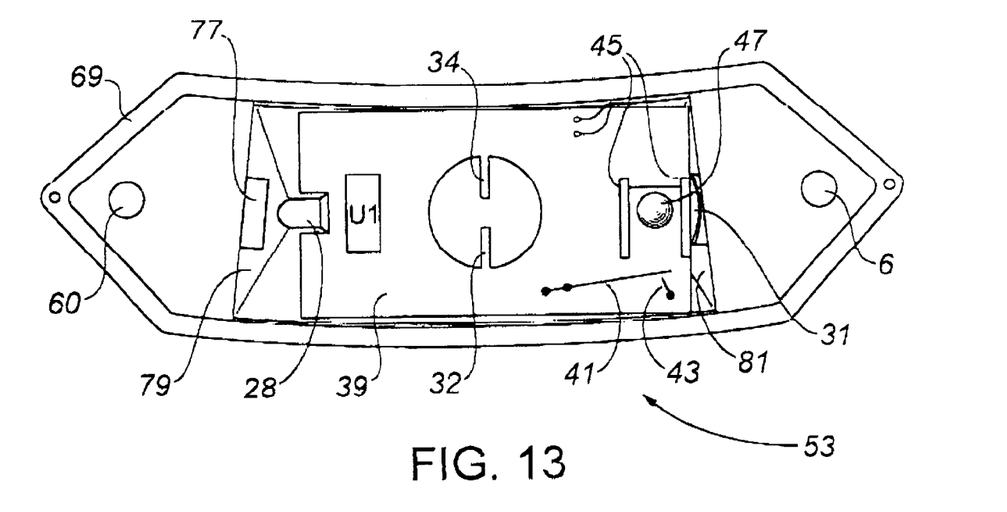
FIG. 13 is a view of the interior of the left half of the housing with the electronic unit positioned therein.

The housing 7 of the safety light comprises two similar halves, a right half 51 which comes into contact with a spoke when the housing is mounted on a bicycle, and a left half 53. These halves are illustrated in FIGS. 8 to 11. FIG. 12A is a perspective lateral view of the housing 7 of the device showing the two halves assembled, FIG. 12B is a longitudinal cross-section of the housing 7 of the device, FIG. 12C is a transversal cross-section of the housing of the device, while FIG. 13 is a view of the interior of the left half of the housing with the electronic unit positioned therein. All these Figures will be referred in the following description.

The right and the left halves of the safety light housing are comprised of multi-faceted light transmissive plastic. A fragmentary illustration of the multi-faceted plastic is illustrated at 100 in FIGS. 8 and 10. Each half has a V-shaped transversal cross-section, as can be better seen on FIG. 12B and 12C. The two lens halves are shaped to receive the components mounted on the switch side of the printed circuit board 39 in the hollow space 52 formed inside right half 51 and to accommodate the electronic components of the printed circuit board 39 in the hollow V formation 54 of the left half 53.

Figure 8:
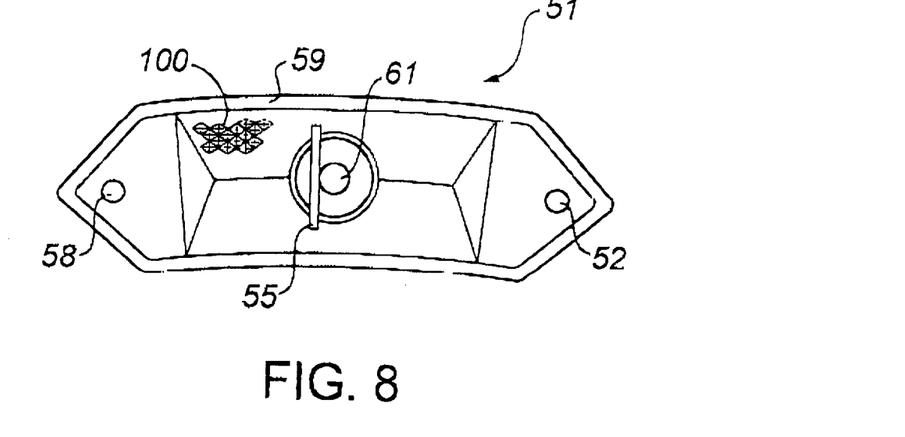
FIG. 8 is a frontal view of the right half of the lens housing of the safety light of the present invention, showing the external features of the half.

FIG. 8 illustrates a spoke slot 55 moulded into lens right half 51 for receiving the spoke 3. A central hole 61 receives the means for fixing, namely screw fastener 62 and nut 64, illustrated in FIG. 12A and 12C, or alternatively a plastic quick lock fastener.

Figure 9:
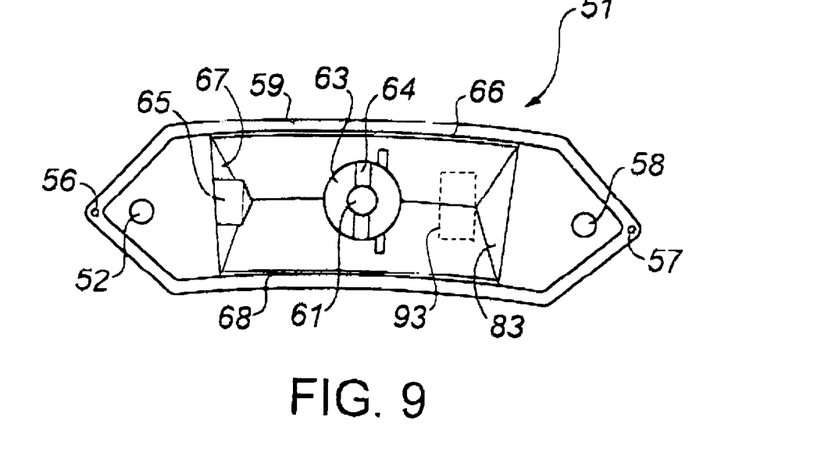
FIG. 9 is frontal view of the right half of the lens housing of the safety light, showing the internal features of the half.

FIG. 9 shows a central shaft 63 in the centre of right half 51. The shaft supports the PCB 39. The groove 64 provided in the shaft 63 is for receiving the finger shaped patches 32 and 34 of the enabling switch 29.

The half 53 constitutes a light circuit, designed to receive, amplify and distribute the light emitted by photodiode 28. The light emitted by photodiode 28 advances from entry node 65 through the V panel 67, to the housing walls, and the border 59. Entry node 65 is made by moulding a small rectangular light pipe in a place where it receives light emitted by the photodiode 28. Border 59 goes along the edge of the housing and is made of light transmissive material. The border 59 of square cross section of approximately 0.10" is formed by moulding smooth transmission light conduits emanating from the light pipe entry node 65.

Figure 10:
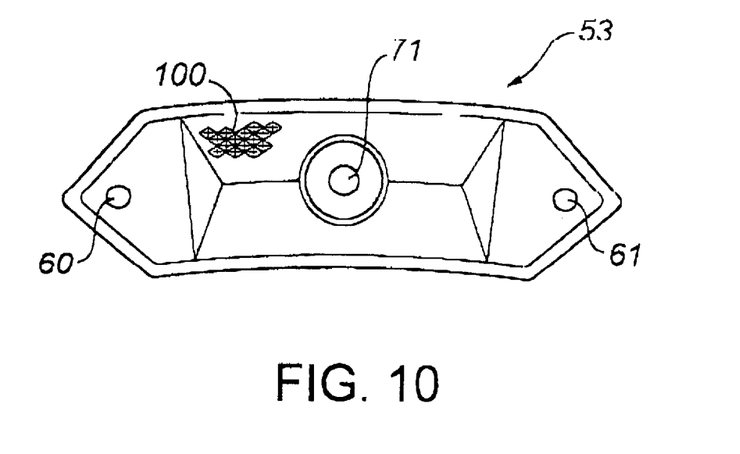
FIG. 10 is frontal view of the left half of the lens housing, showing the external feat of the half.

Looking now at FIG. 10, the exterior of the left and right halves are similar. Central hole 71 receives the screw 62 of the fixing means for assembling the two halves of the housing.

A central shaft 73 is provided in the centre of the left lens as shown in FIG. 11, and it has an indentation 75 for supporting and fixing battery 31 when the halves are assembled. A support 91 with a circular indentation 92 is provided on V-panel 81 to support and fix battery 31 at a side opposite to indentation 75. Thus, battery 31 is not allowed to move when the halves are mounted to form the housing 5. Node 77 is provided as for the right half, to receive light from photodiode 28, transmit it through V panel 79 to housing walls and to border 69.

The border 69 of left half 53 has a cross section again of 0.10" and is arranged around the total outside circumference of the lens, as seen on FIGS. 10 and 11.

The flashing light emitted by light source 23 is transmitted through plastic lens housing by aid of the light pipe formed by border 69 of left half and border 59 of right half, which carry light throughout entire housing and around the whole perimeter of the lens thus providing the effect of one single large light source.

FIGS. 12A to C show the lens assembled to form housing 7, electronics removed. Lens halves are held together by small locking guide pins moulded into plastic lens halves or by adhesive or ultrasonic welding, the later being preferred for weather tight sealing. In the embodiment illustrated in FIGS. 8 to 12, a small hole 56 and a pin 57 are provided on right half and a corresponding pin 72 and hole 74 are provided on the left half, for aligning the halves before assembling the housing. In addition, fastening means as plastic screws 66 are passed through holes 58, 61 and 52, 60 for assembling the halves to each other with nuts 68.

FIG. 13 is a view of the interior of the left half of the housing with the electronic unit positioned therein. The printed circuit board 39 is assembled to have the light source 23 facing the light entry nodes 65 of right half and 77 of left half.

The circuit board assembly 39 is held in position by lens half guide mouldings 66 and 68 in the right half, and guide mouldings 76 and 78 in the left half, which extend along the interior of the curved sides of each respective half, as seen better on FIGS. 9 and 11. The PCB 39 is also held between the central shafts 63 and 73 and nodes 65 and 77 when the halves are assembled.

The battery 29 is positioned and held in the lens housing when the halves are joined together, by guide 75, support 90 and by a support post 80 optionally provided in the left half.

The means for attaching the housing of the device 1 to spoke 3 are illustrated in more detail on FIGS. 12A and 12C. The halves 51 and 53 are mechanically fastened to spoke 3 through holes 61, 71 of each respective lens half with a screw fastener 62, and nut 64, or alternatively a plastic quick lock fastener.

The operation of the motion detector 29 will be explained in further detail in the following, reference being made to FIG. 14. The switch 41, 43 is engineered to provide continuously the control signal 28 to the input of control unit 21 when the bicycle wheel rotates at low speed and high speed.

Low speed is defined as the speed of the bicycle where the velocity V of the rotating wheel is such that $V < V_{tire}$, while high speed is defined as the speed of the bicycle where the velocity V of the wheel is greater than $V_{tire}$.

The parameter $V_{tire}$, which represents the rotational wheel velocity at outside perimeter of tire is calculated using the following definitions:

a=acceleration of the revolving wheel, which may be calculated with formula $$a=v/r^2 \qquad (1)$$

rev=revolution of the wheel which may be calculated with formula $$rev=V/(2*\pi*r) \qquad (2)$$

g=gravitational acceleration
$V_{ball}$=rotational velocity of ball at point in question which may be calculated with formula $$V_{ball}=g*R1 \qquad (3)$$

R1=radius from the hub center to the housing mounting point, and
R2=radius from the hub center to the outside of the tire.
Particularizing the parameters in equation (2) we get:

$$rev=V_{ball}/(2\pi R1) \qquad (2')$$

$$V_{tire}=rev*2\pi R2 \qquad (3')$$

Using substitution we obtain:

$$V_{tire}=rev*2\pi R2=V_{ball} *R2/R1=g*R1\ R2/R1 \qquad (4)$$

Under low speed conditions, the mass of the ball combined with the displacement allowed by guides 45 and force of gravity create enough momentum resulting in enough force to overcome spring constant of cantilever 41 and close gap 42 to make electrical contact to stop 43.

Figure 14:
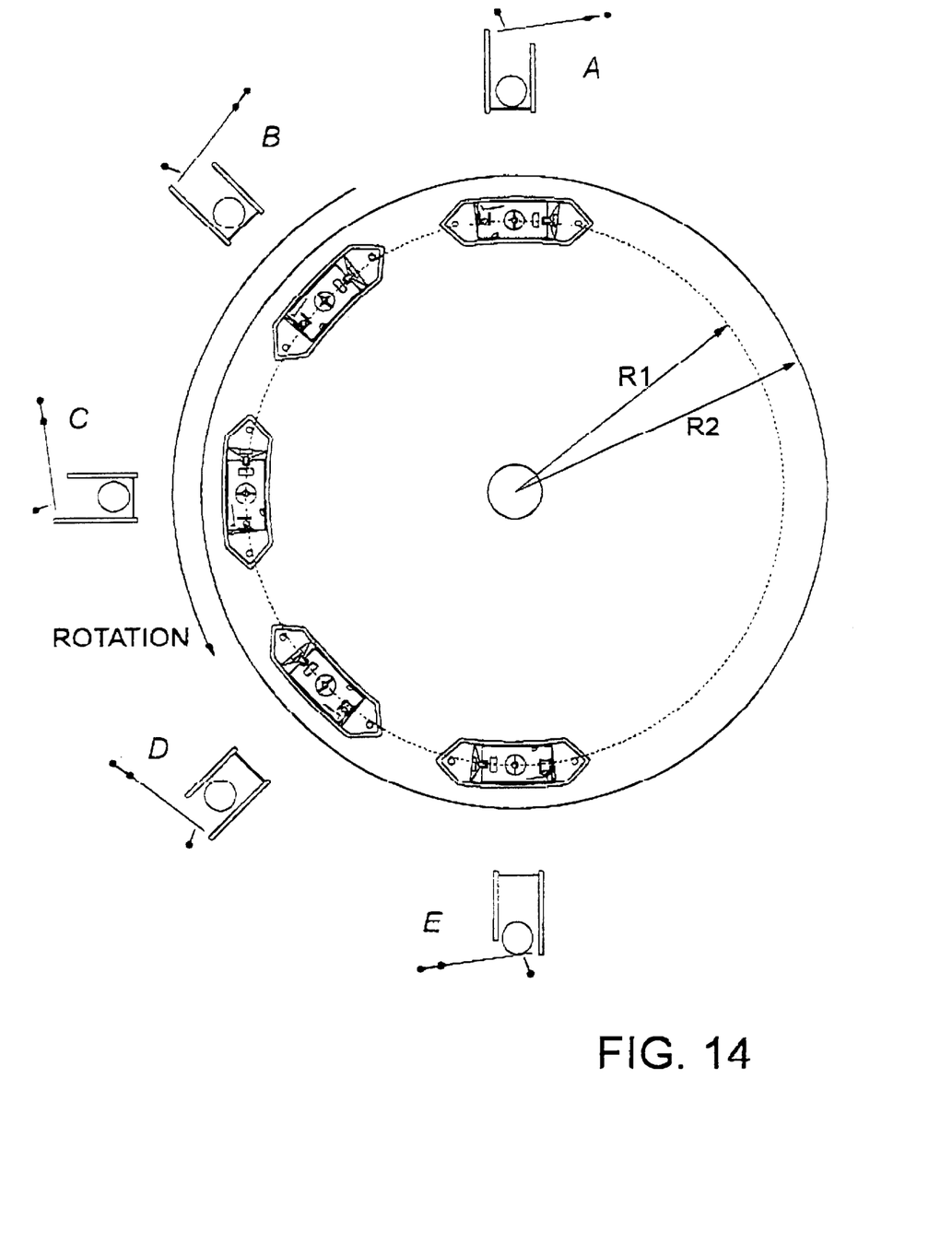
FIG. 14 is a pictorial diagram of motion switch in slow speed operation.

FIG. 14 provides a detailed view of the motion switch components illustrating in detail the motion of the ball in the ball track as the bicycle wheel moves in a counter clockwise direction starting from position "a" to position "e". In position "c" the ball now entering the zone where the force of gravity will allow the ball to gather enough momentum to impart energy onto the switch cantilever 45 to close the contact between the cantilever and contact point 47. A small notch can be added to the bottom side of the track 49 to further delay ball travel to a point beyond "c" so that free fall velocity will be higher thus imparting increased energy onto the switch lever.

Under high speed conditions, the mass of the ball 43 combined with the centrifugal force created by the wheels rotational velocity exert enough force onto cantilever 45 to overcome cantilever spring constant and continuously close gap 50 to make a contact with fixed contact stop 47.

The safety light of the invention is assembled as follows. The right and left haves 51 and 53 are equipped with the light nodes 65 and 77. The battery 31 is then arranged in half 53, guided by battery guides 75 machined in the central shaft 73 and support 91. The assembled printed circuit board 39 is then arranged on the guide mouldings 66 and 68 of the right half and guide mouldings 76 and 78 of the left side, with the components facing towards the hollow space 95 of the left half 53. The photodiode 28 is oriented towards the entry node 77. The other half, in this case half 51 is placed to close the housing 7. Area 93 illustrated in dotted lines on FIG. 9 closes the ball passage in cooperation with the area referred to as 44 on the printed circuit board, guides 45 and tip 46 of cantilever 41.

A preferred embodiment of the invention has been described by way of example. Those skilled in the art will realize that various modifications and changes may be made while remaining within the spirit and scope of the invention. Hence the invention is not to be limited to the embodiment as described but, rather, the invention encompasses the full range of equivalencies as defined by the appended claims.

We claim:

1. A safety light for attachment on a bicycle wheel comprising:
   a light source for emitting an output signal having a frequency in a visible range domain;
   light detecting means for generating a first control signal when ambient illumination is under a threshold;
   a control unit for receiving said first control signal and accordingly generating an actuating signal for switching on or off said light source; and
   a housing of multi-faceted transmissive walls for enclosing said control unit and for receiving and transmitting said output signal from said light source to produce a highly visible light, wherein
   a light path is provided about a periphery of said housing for guiding the output signal from the light source to the multi-faceted transmissive walls, said light path including a light pipe entry node and light pipes arranged about the periphery of said housing in optical contact with the walls of said housing.

2. A safety light as claimed in claim 1, further comprising motion detecting means for generating a second control signal to said control unit when motion of the bicycle is detected, wherein said control unit receives said second control signal and said first control signal before generating said actuating signal.

3. A safety light as claimed in claim 1, further comprising break switch means for producing a third control signal to said control unit after said safety light is first installed on the bicycle wheel, wherein said control unit receives said third control signal and said first control signal before generating said actuating signal.

4. A safety light for attachment on a bicycle wheel comprising:
   a light source for emitting an output signal having a frequency in a visible range domain;
   light detecting means for generating a first control signal when ambient illumination is under a threshold;
   motion detecting means for generating a second control signal when motion of the bicycle wheel is detected;
   break switch means for producing a third control signal to said control unit after said safety light is first installed on the bicycle wheel;
   a control unit for receiving said first control signal, said second control signal and said third signal and accordingly generating an actuating signal for switching on or off said light source; and
   a housing of multi-faceted transmissive walls for enclosing said control unit and for receiving and transmitting said output signal from said light source to the walls of said housing to produce a highly visible light, wherein
   said break switch means comprises two conductive patches on a printed circuit board, said patches being electrically connected with a conductor such that said conductor is broken when said safety light is first mounted on the bicycle wheel.

5. A safety light as claimed in claim 4, wherein said control unit comprises:
   a state detecting unit for receiving said first, said second and said third control signals and producing an enabling signal when said first, said second and said third control signals are present;

an oscillator for generating said actuating signal of a given frequency, when said enabling signal is applied to said oscillator; and a duty cycle circuit for determining a duty cycle of said actuating signal.

6. A safety light as claimed in claim 4, wherein said light source is a light emitting diode.

7. A safety light as claimed in claim 4, wherein said motion detecting means comprises:

a normally open switch with a first and a second contact elements leaving a gap between said first element and said second element; and a ball restricted to travel within a closed passage under the action of a force resultant from motion of said safety light and gravitational force, said ball urging said first contact towards said second contact when the housing is displaced.

8. A safety light comprising:

an electronic unit for detecting ambient illumination and automatically emitting an output signal of a frequency in a visible range, when the ambient illumination is under a threshold;

a housing having walls for enclosing the electronic unit and for receiving and transmitting said output signal from said electronic unit to the walls of the housing to produce a highly visible light;

the housing including a first half and a second half, symmetrically shaped for receiving, amplifying and transmitting said output signal and for enclosing said control unit, wherein each of said first half and second half of said housing comprises:

two lateral walls connected along a long side to define a generally V-shaped space therebetween;

two V-shaped sections of light pipes, each arranged at an end of said lateral walls to further delimit the V-shaped space:

a light pipe entry node on a V-shaped section for receiving said output signal and for directing said output signal through said V-shaped section to the walls; and a light path provided about a periphery of said first half and said second half for guiding said output signal to travel about the periphery.

\* \* \* \* \*